No. 762,522. PATENTED JUNE 14, 1904.
F. W. GILLESSEN.
BOTTLE WASHING MACHINE.
APPLICATION FILED DEC. 10, 1903.
NO MODEL. 6 SHEETS—SHEET 1.

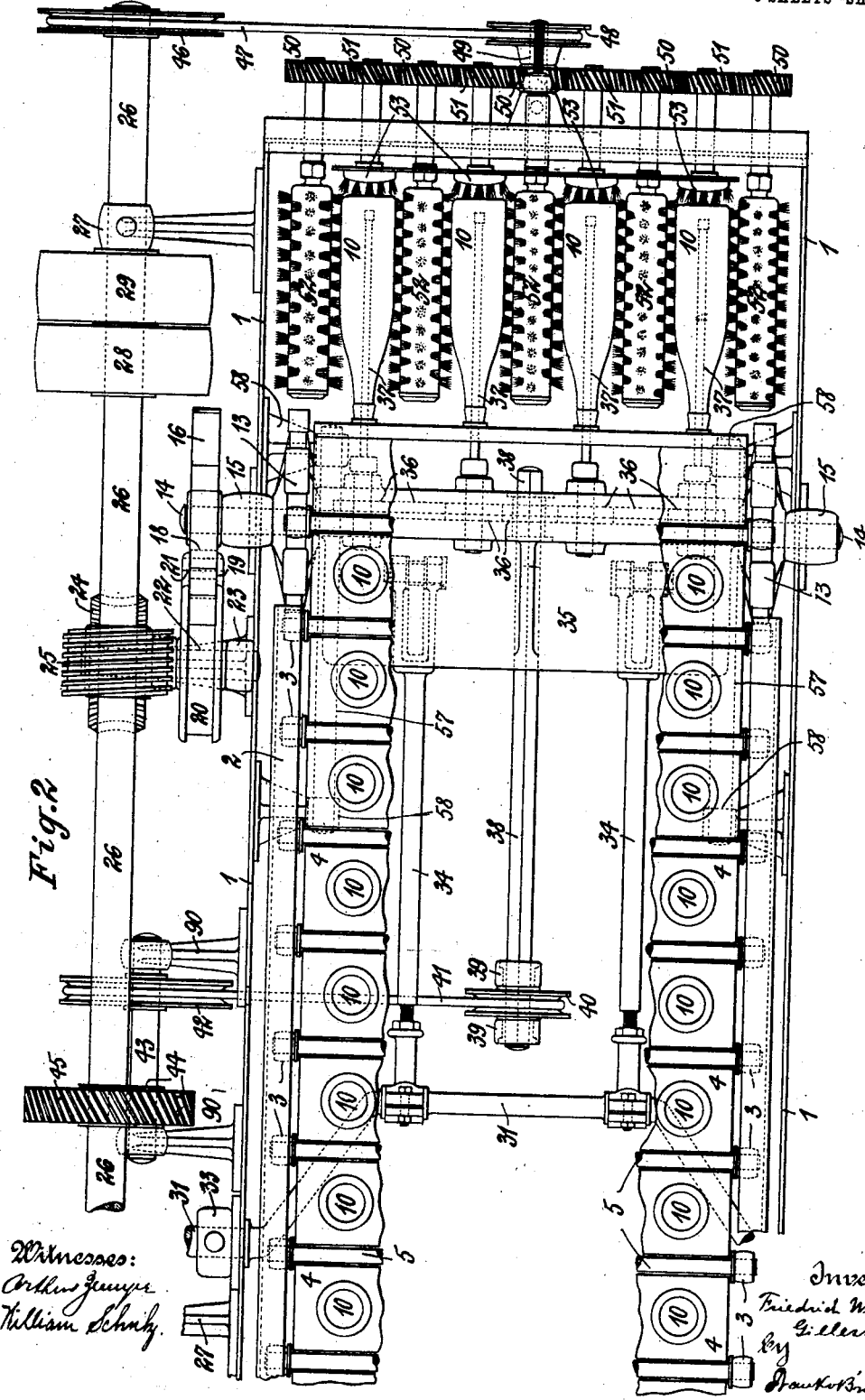

No. 762,522. PATENTED JUNE 14, 1904.
F. W. GILLESSEN.
BOTTLE WASHING MACHINE.
APPLICATION FILED DEC. 10, 1903.
NO MODEL. 6 SHEETS—SHEET 3.
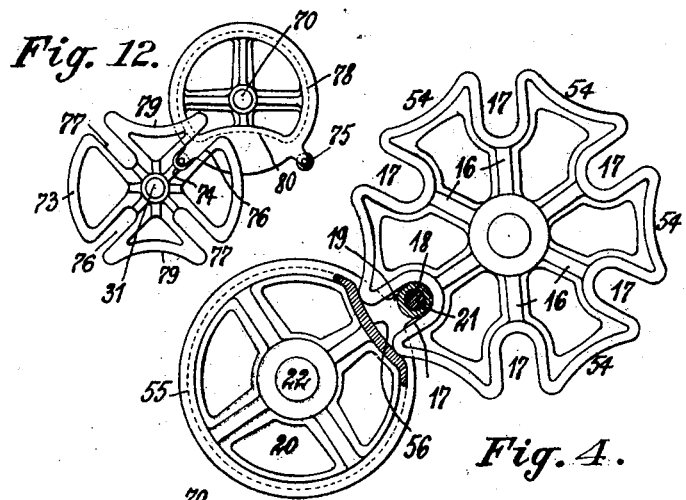
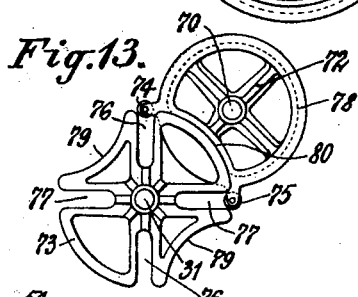
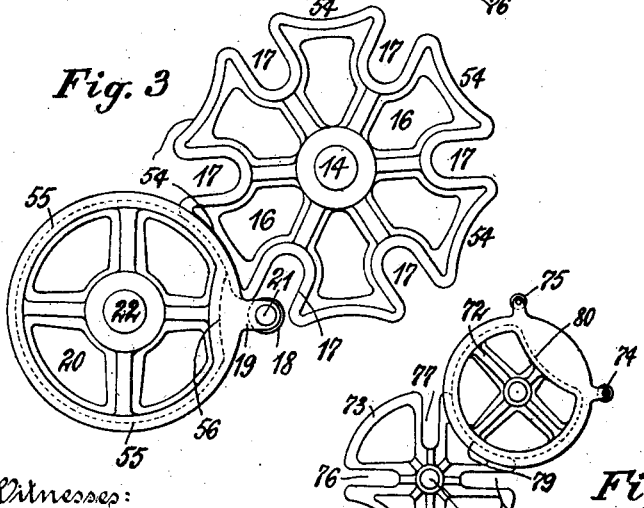

No. 762,522. PATENTED JUNE 14, 1904.
F. W. GILLESSEN.
BOTTLE WASHING MACHINE.
APPLICATION FILED DEC. 10, 1903.
NO MODEL. 6 SHEETS—SHEET 4.

Witnesses
Arthur Younge
William Schulz

Inventor
Friedrich Wilhelm Gillessen
by Franko'Brien Atty

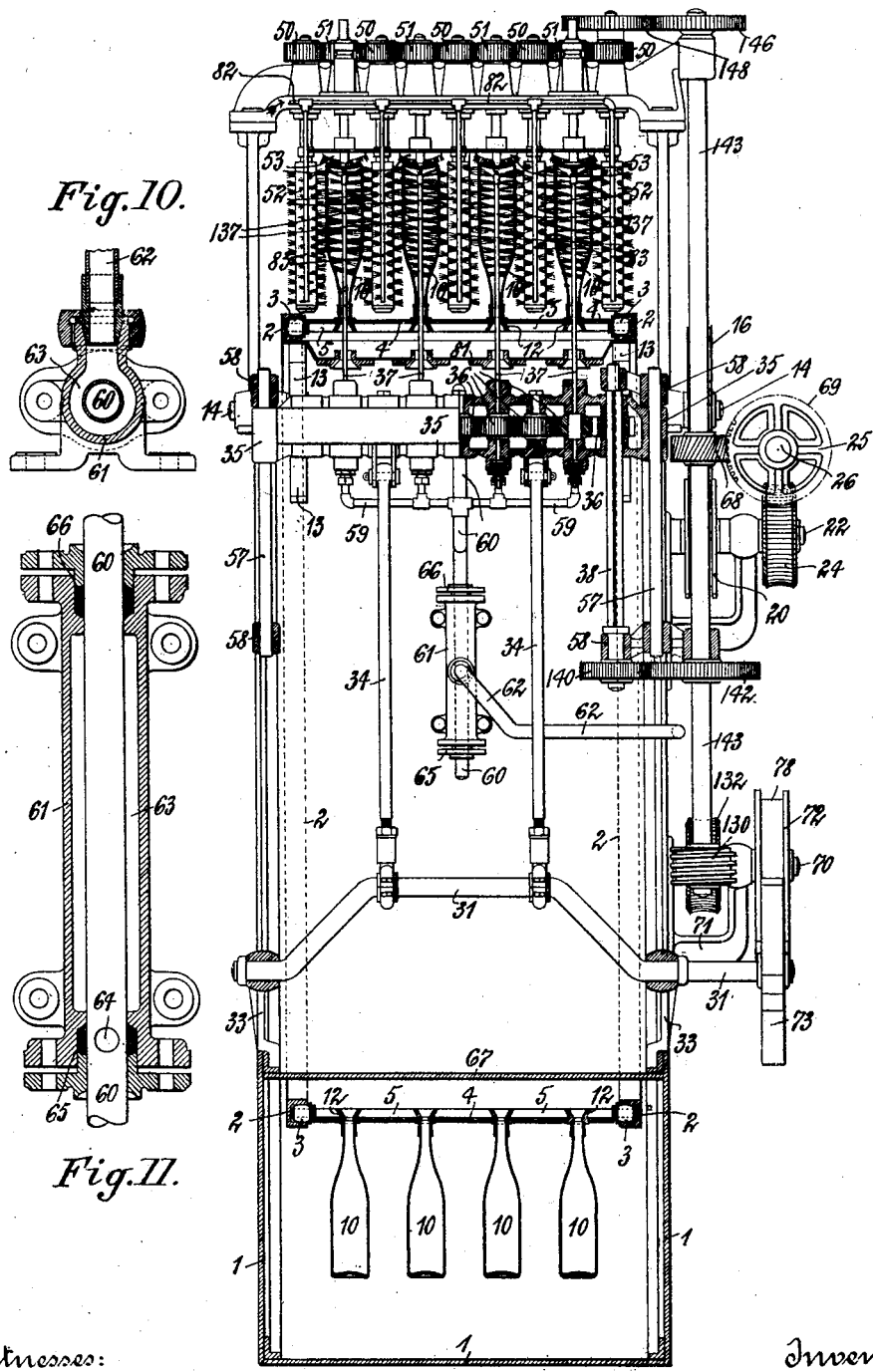

No. 762,522.

Patented June 14, 1904.

UNITED STATES PATENT OFFICE.

FRIEDRICH WILHELM GILLESSEN, OF HAMBURG-ST. PAULI, GERMANY.

BOTTLE-WASHING MACHINE.

SPECIFICATION forming part of Letters Patent No. 762,522, dated June 14, 1904.

Application filed December 10, 1903. Serial No. 184,678. (No model.)

*To all whom it may concern:*

Be it known that I, FRIEDRICH WILHELM GILLESSEN, a citizen of the German Empire, and a resident of Hamburg-St. Pauli, Germany, have invented certain new and useful Improvements in Bottle-Washing Machines, of which the following is a specification.

This invention relates to a bottle-washing machine, two constructions of which are illustrated, by way of example, in the accompanying drawings, in which—

Figure 1:
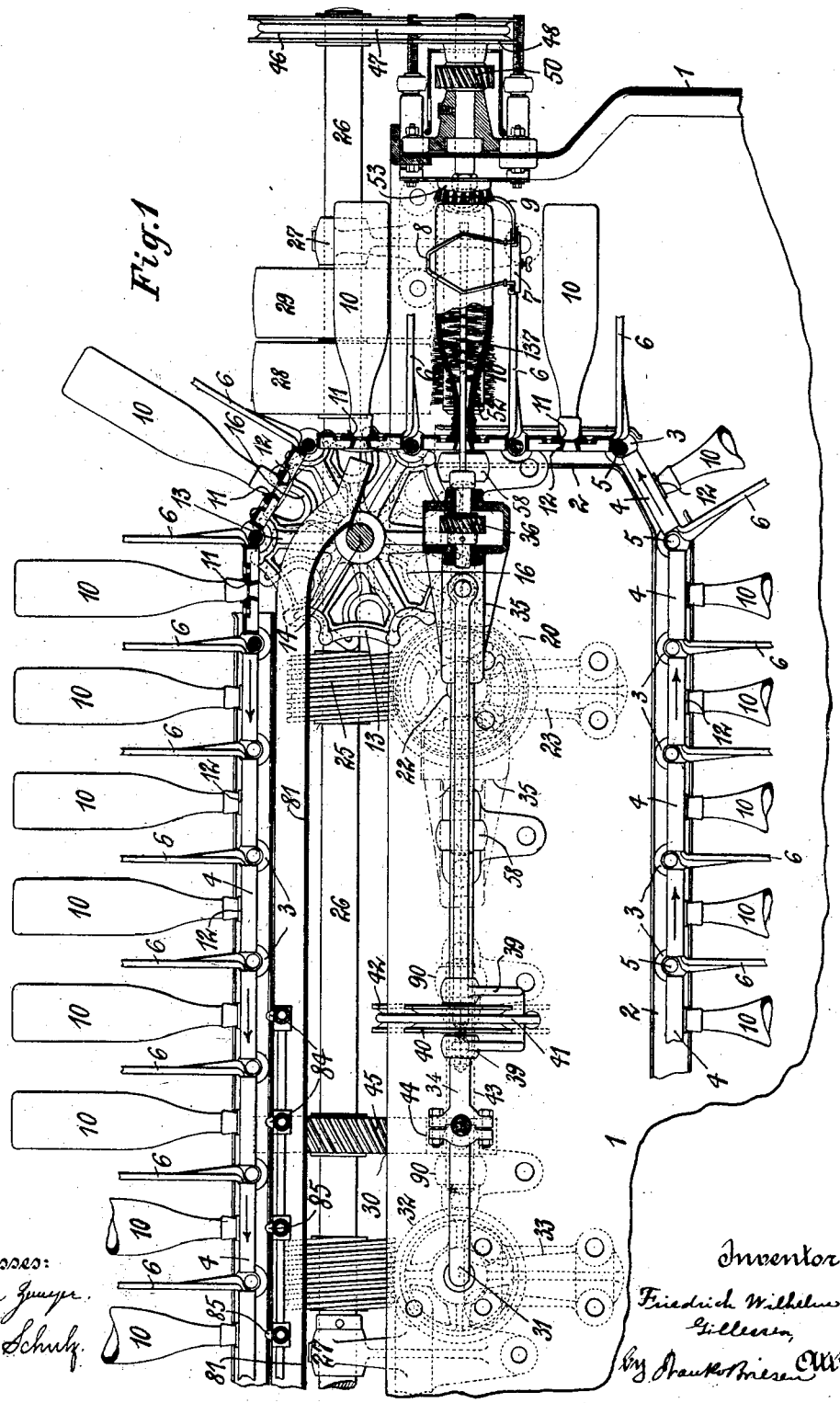
Figure 5:
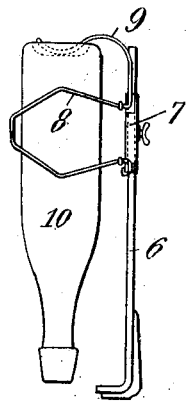
Figure 6:
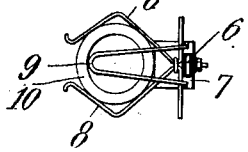
Figure 7:
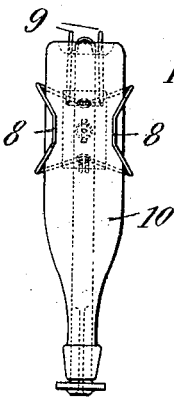
Figure 15:
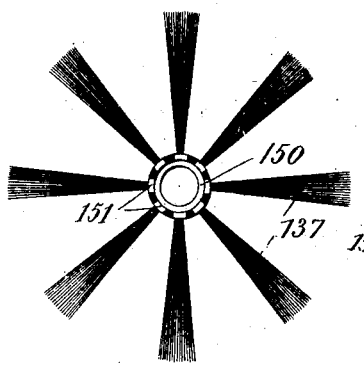
Figure 16:
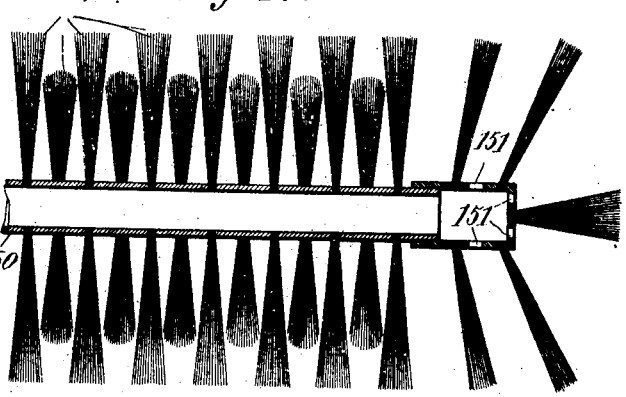
Figure 17:
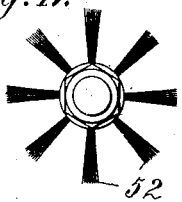
Figure 18:
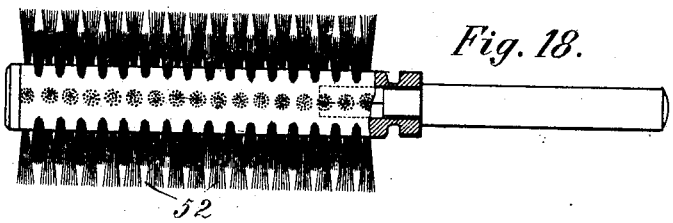
Figure 8:
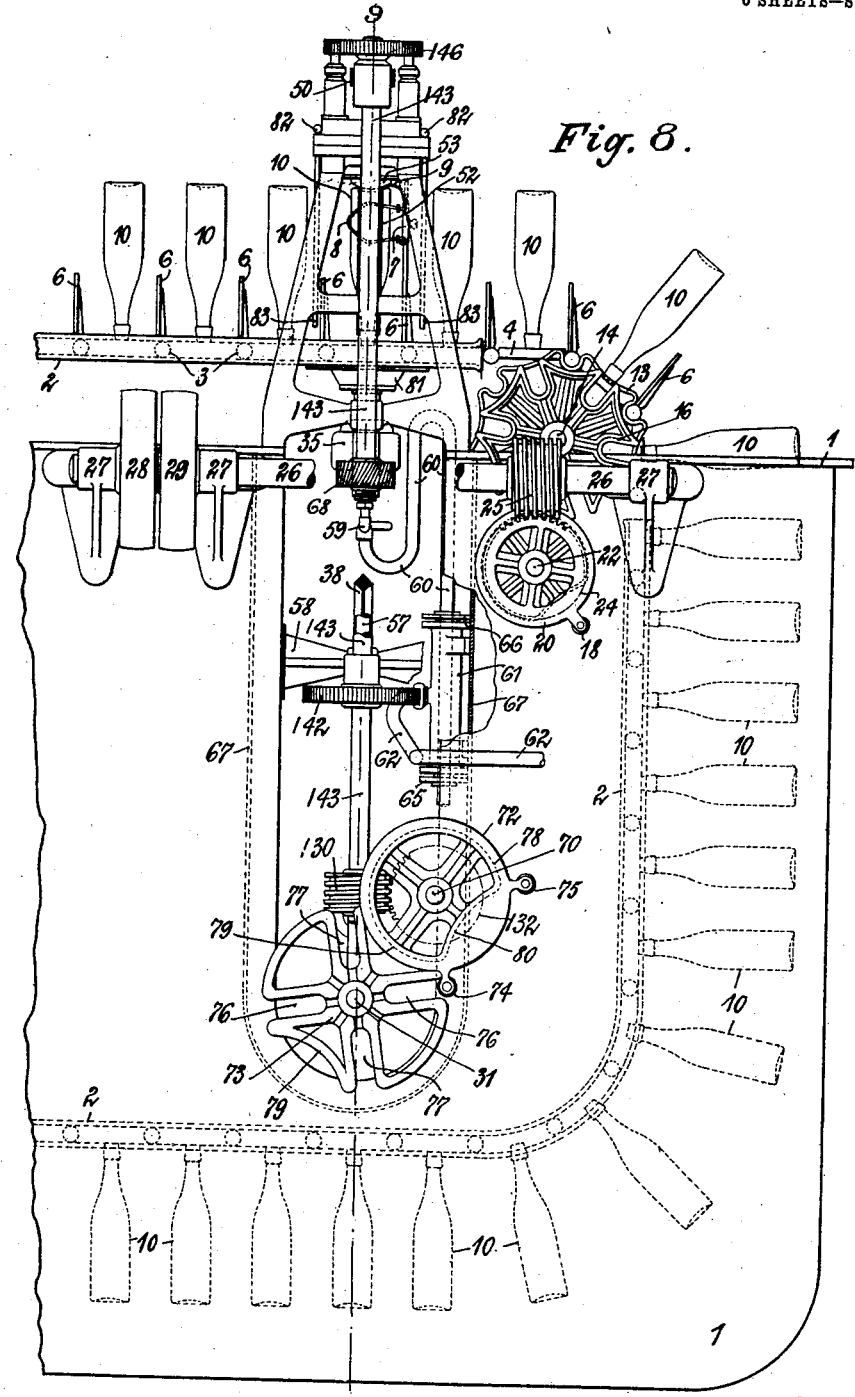

Figure 1 is a plan, partly broken away, of my improved bottle-washing machine; Fig. 2, a side elevation partly in section and partly broken away. Figs. 3 and 4 are details of the driving-gear. Figs. 5 to 7 are details of the bottle-clamping device. Fig. 8 is a side view, partly broken away, of a modification of the machine; Fig. 9, a vertical section on line 9 9, Fig. 8; Fig. 10, a detail cross-section of the cylinder for supplying water to the inner brush of the modified construction of the machine; Fig. 11, a detail longitudinal section thereof. Figs. 12 to 14 are details of the driving-gear of the modified construction; Figs. 15 and 16, details of the inner brush of the modified construction; Figs. 17 and 18, details of the outer brush, and Figs. 19 and 20 details of the bottom brush.

The machine according to this invention is chiefly distinguished by an endless chain passing through a soaking-vat, the bottles to be washed being secured to the links of the said chain in such manner that the inner brushes connected to a brush-head guided in the vat inside the chain can enter the bottles through the links of the chain when the latter is in a certain position. In order to make this possible, the links of the chain are provided with sockets or holes into which are placed the mouths of the bottles. In order to prevent the bottles from shifting laterally, said sockets are provided with recesses into which the mouths of the bottles are introduced. The point of special importance is that the bottles to be brushed should always be brought to the same place. For this purpose there is a special feeding device which at the same time provides for braking the chain during the cleaning of the bottles by the brushes.

The numerals 2 2 represent two parallel rails of an endless track. Each of these rails is engaged by rollers 3, mounted upon axles 5, that span the track. Between each pair of shafts 5 are arranged pivoted plates or links 4, which, in conjunction with the shafts, constitute a wide endless apron or chain. To each link 4 is secured an arm 6, on which is adjustably mounted a holder 7 for clamping-springs 8, 8, and 9. Two springs 8 clamp each bottle 10 laterally, the spring 9 forcing it at the same time into the corresponding socket or recess 11 in the chain-link 4. These recesses 11 are formed by sockets 12, secured strongly to the links 4. Each chain-link 4 can be provided with any desired number of such sockets for receiving a corresponding number of bottles 10.

In each of the two constructions of the machine illustrated in the accompanying drawings each chain-link is arranged to receive only four bottles.

The endless transport-chain is guided by four chain-wheels 13. Each two of these wheels 13 are mounted on a common spindle 14, supported in bearings 15, secured to the vat 1. To one end of the spindle 14 is secured a wheel 16, provided with radial recesses 17, into which fits a roller 18, rotatably mounted on a pin 21, connecting two arms 19 of a pulley 20. The pulley 20 is secured to a short spindle 22, supported in a bearing 23, secured to the vat 1. To the same spindle is also secured a worm-wheel 24, with which engages a worm 25. The latter is secured to a driving-shaft 26, supported in bearings 27, secured to the vat 1.

To the shaft 26 is secured a second worm 30, driving a worm-wheel 32, secured to a crank-shaft 31. The latter is supported in brackets 33, secured to the vat 1 and joined by two connecting-rods 34 with the brush-head 35, in which are arranged pinions 36, engaging with each other. Four of these pinions 36 are secured to the inner brushes 37. The central pinion 36, which is mounted slidably on a spindle 38 of square cross-section supported in brackets 39, is driven as follows: Between the brackets 39 is mounted on the spindle 38 a rope-pulley 40, driven by a cord 41 from the pulley 42, secured to the spindle 43. In the spindle 43, supported in brackets 45, secured to the vat 1, is mounted a toothed wheel 44, engaging a toothed wheel secured to the driving-shaft 26.

On the driving-shaft 26 is mounted, finally, a rope-pulley 46, driving, by means of a cord 47, a pulley 48. The latter pulley is secured to the shaft 49, provided with a toothed wheel 50, driving toothed wheels 51, arranged laterally of it. These latter engage with adjacent wheels 50, which again engage with other wheels 51, and these again with wheels 50. The spindles of the wheels 50 carry the outer brushes 52 and the spindles of the wheels 51 the bottom brushes 53.

Figs. 1 and 2 show parts of the machine in the position occupied when the bottles held by a chain-link having arrived between the outer brushes are being cleaned inside and outside.

After the bottles 10, mounted on a chain-link, have been cleaned the brush-head 35 is moved back—that is to say, the brushes 37 are withdrawn from the bottles 10. The brush-head 35 takes then the position indicated by chain dotted lines in Fig. 1. The chain is then moved farther in the direction of the arrow, and the roller 18 of the wheel 20, that receives continuous rotary motion from driving-shaft 6 in the manner described, engages with one of the recesses 17 of the wheel 16, thus causing the latter to participate in the movement, Fig. 4. After the chain has been advanced to the extent of one link, which is the case after the roller 18 has become disengaged from the recess 17, Fig. 3, the wheel 16 is held fast by the wheel 20, although the latter continues to rotate, owing to the circumference of the wheel 20 engaging with the corresponding trough-like recess 54 between each two recesses 17 of the wheel 16, Fig. 3, so that the latter must therefore remain perfectly still. Only when the roller 18 engages with the next recess 17 will the wheel 16 again be rotated, the corners formed by two recesses 17 and one recess 54 engaging with a recess 56 of the wheel 20. In this way the wheels 20 and 16 constitute a movement similar to a Geneva movement for imparting intermittent motion to the feed-chain. The brush-head 35 slides on two lateral guide-rods 57, supported in brackets 58, secured to the vat. The square spindle 38 can either slide in the bearings 39 of the pulley 40 or is fixed, in which case the brush-head 35 moves on the said spindle.

After the series of bottles on one chain-link 4 has been washed the chain is moved farther. In this way the washed bottles 10 arrive finally at the horizontally-guided chain portion, so that the rinsing-water can readily flow out of the bottles. The bottles 10 in their travel arrive over jet-heads 84 and 85. The jet-heads 84 inject warm and 85 cold water into the bottles 10. After they have been completely drained, the last remainder of water may be expelled from the bottles by blowing in air, so that they can be filled immediately in being taken off the chain.

While in the construction illustrated in Figs. 1 and 2 the brush-head 35 is moved longitudinally of the vat 1 and the bottles 10 washed in horizontal position, in the construction shown in Figs. 8 and 9 the brush-head 35 is moved up and down, so that the bottles must be in vertical position when they are being washed by means of the inner, outer, and bottom brushes.

The inner brushes 137 are composed of tubular stems 150, which are perforated at their top, as at 151, for admitting fresh water to the bottle during the washing. The tubes 150 pass through the brush-head 35 and are joined by suitable connections with a cross-pipe 59, to which is connected the pipe 60, closed at the bottom and sliding in a cylinder 61. Water is supplied to the said cylinder 61 by means of a pipe 62. The cylinder is of such a diameter as to form an annular chamber 63 round the pipe 60. Water supplied to the chamber through the pipe 62 enters the pipe 60 as soon as the aperture 64 of the latter, Fig. 11, is above the lower stuffing-box 65 at the bottom of the cylinder. A second stuffing-box 66 closes the cylinder at the top. The cylinder 61 is secured to a casing 67, which is bent to a loop shape and secured transversely to the vat 1. It forms a sack-shaped structure, in which the brush-head 35 moves on the rods 57, secured to brackets 58. In two of said brackets—say the two right-hand brackets 58—is supported the square spindle 38, on which slides the pinion 36, with the brush-head 35. To the spindle 38 is secured a toothed wheel 140, with which engages the toothed wheel 142, secured to the spindle 143. The spindle 43 is driven by means of worm-wheels 68 and 69 from the driving-shaft 26, and drives, by means of the wheels 146, 148, 50, and 51, the outer brushes 52 as well as the bottom brushes 53.

The worm 130, which drives the crank-shaft 31, is not secured, as in the first construction, to the driving-shaft 26, but to the shaft 43, driven from the latter. It engages with a worm-wheel 132, secured to the shaft 70. To the same shaft or spindle 70, supported in a bracket 71, is secured a wheel 72, which causes the advance of the disk 73, secured to the crank-shaft 31. The wheel 72 is provided with two rollers 74 and 75, which by consecutively engaging with the recesses 76 and 77 of the disk 73 cause the latter to turn through an angle of one hundred and eighty degrees, so that the brush-head 35 is brought once into a completely-raised and once into a completely-lowered position and held in that position for a short time. At each turn of the wheel 72 the disk 73 is therefore only half-turned. Immediately after each half-turn of the disk 73 it is braked by the wheel 72, the circumference 78 of the latter sliding on the trough-shaped surface 79, with which the disk 73 is provided between each two recesses 76 and 77.

Figure 19:
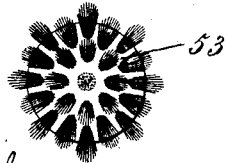
Figure 20:
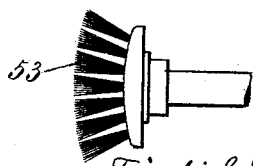

Figs. 18, 19, and 20 show three different positions of the disk 73 with the feeding-wheel 72. In order to enable the disk 73 to rotate, the wheel 72 is provided on its circumference with recesses 80, depressions, or the like.

Over the brush-head 35 is arranged a drain-board 81, secured to the channel-irons 2, serving as guide to the bottle-transport chain, the brushes 137 passing through the said drain-board, which catches the water escaping from the cleaned bottles 10 and discharges it.

Water is supplied to the outer brushes 52 by means of a pipe 82 with branches 83.

The driving-shaft 26 is provided with fast and loose pulleys 28 and 29, that receive motion from a counter-shaft in a suitable manner.

What I claim is—

1. In a bottle-washing machine, the combination of a vat with an endless track, rollers engaging the same, shafts carrying the rollers, socketed pivoted plates intermediate the shafts, and bottle-clamping devices secured to the plates, substantially as specified.

2. In a bottle-washing machine, the combination of an endless chain having socketed plates, with means for imparting intermittent motion thereto, arms secured to the plates, clamping-springs secured to the arms, an intermittently-reciprocated cross-head, brushes secured thereto and adapted to be projected through the plate-sockets, and means for rotating the brushes, substantially as specified.

Signed by me at Hamburg, Germany, this 27th day of November, 1903.

FRIEDRICH WILHELM GILLESSEN.

Witnesses:
FOUST JRUNO BRUMMEL,
OTTO W. HELLMRICH.